May 8, 1951     W. BORNEMANN ET AL     2,552,250
AUTOMATIC PHOTOGRAPHIC CAMERA
Filed Dec. 13, 1947     3 Sheets-Sheet 1
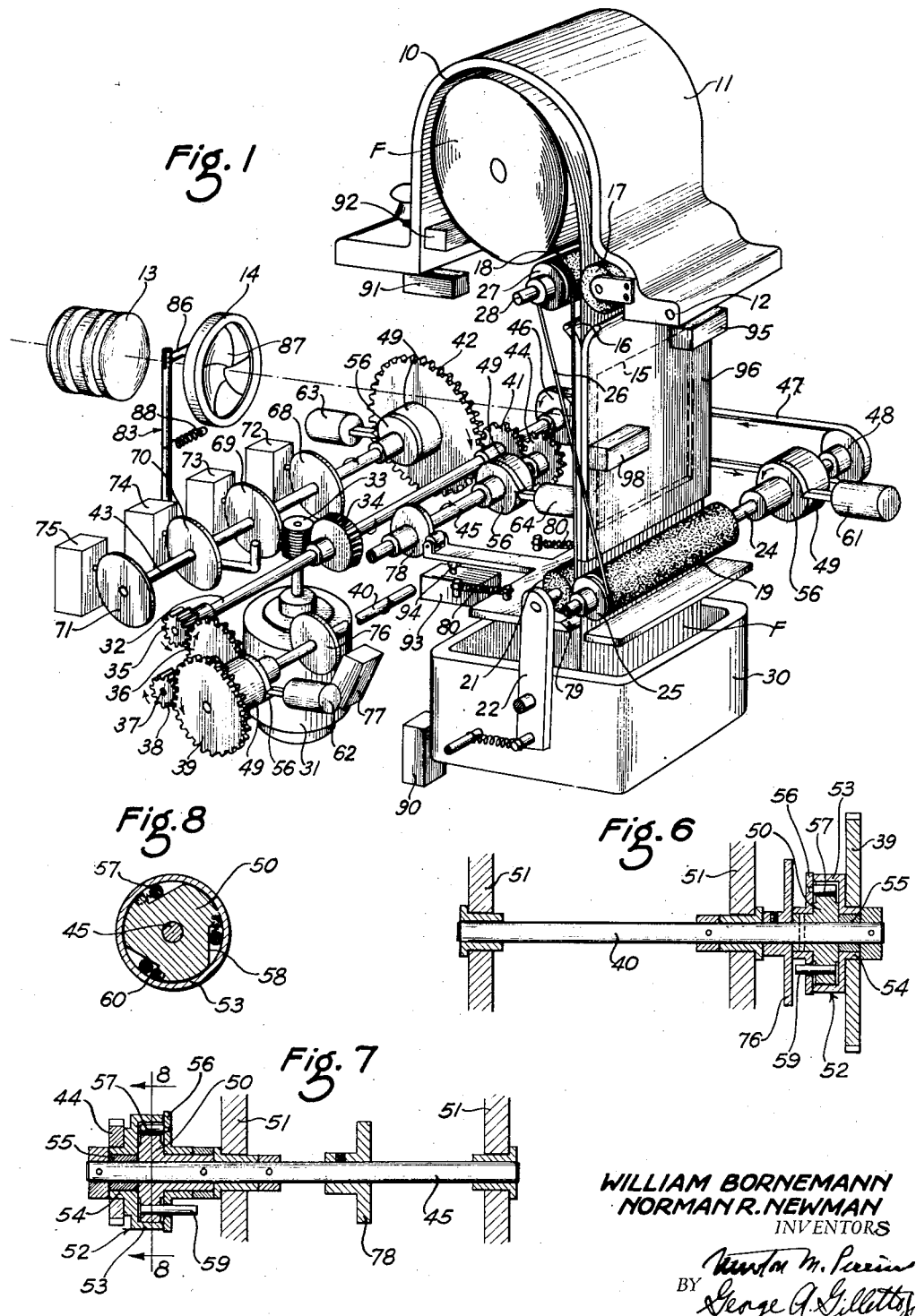
WILLIAM BORNEMANN
NORMAN R. NEWMAN
INVENTORS

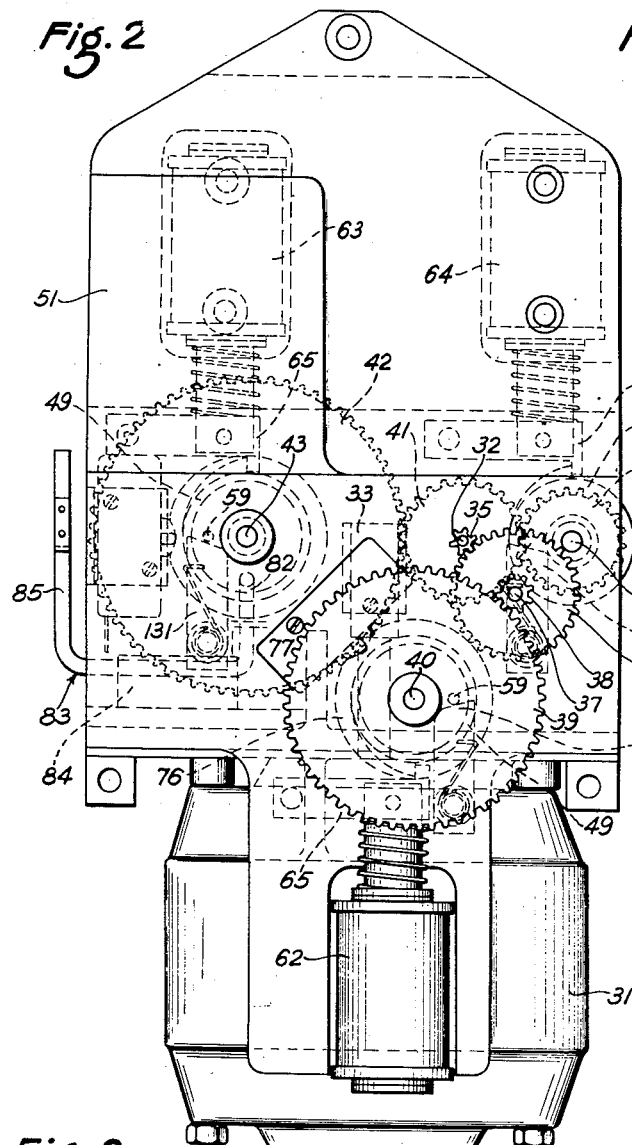
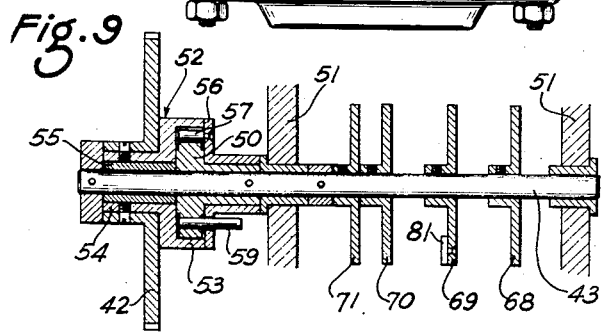
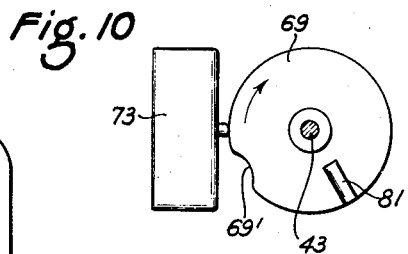
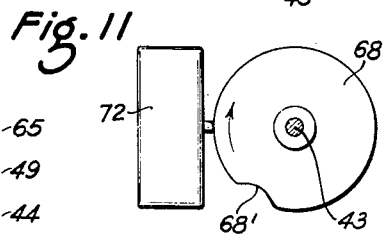
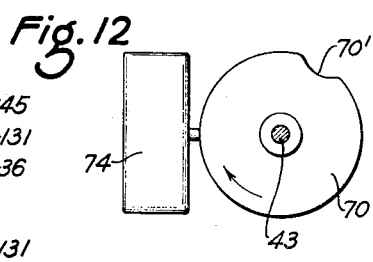
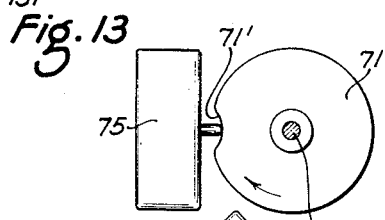
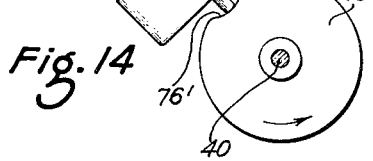

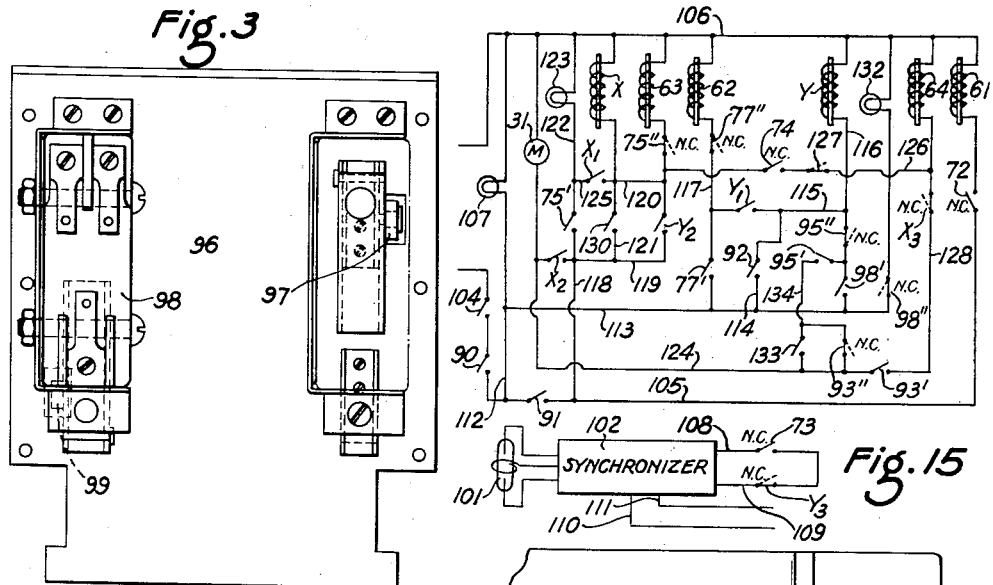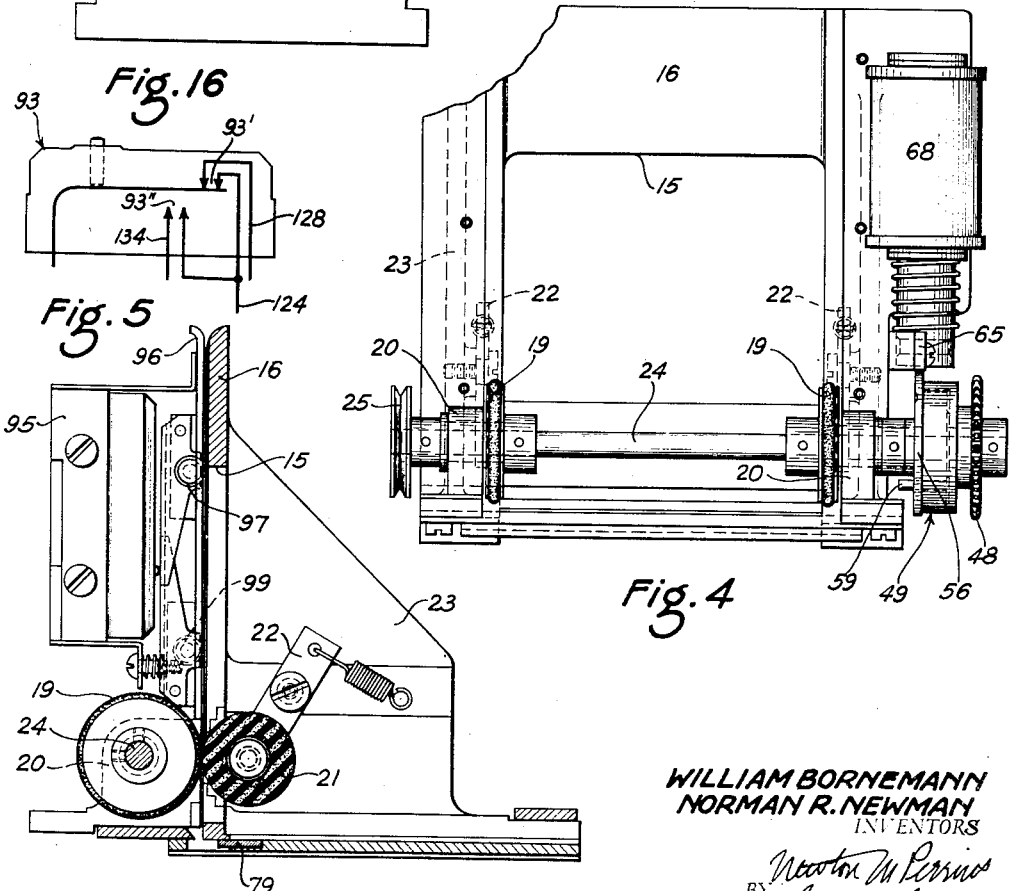

Patented May 8, 1951

2,552,250

UNITED STATES PATENT OFFICE 2,552,250

AUTOMATIC PHOTOGRAPHIC CAMERA

William Bornemann and Norman R. Newman, Rochester, N. Y., assignors to Eastman Kodak Company, Rochester, N. Y., a corporation of New Jersey Application December 13, 1947, Serial No. 791,614

30 Claims. (Cl. 95—11.5)

This invention relates to photography and more particularly to photographic cameras in which all of the normal manual operations for making an exposure are automatically performed by the camera upon the actuation of a single button by the operator.

Automatic cameras in which the actuation of a single button or a single means not a part of the camera results in tripping of the shutter and advancing of the film are well known. However, in these cameras the film after being threaded into the camera must be advanced manually until a signal has been given the operator that the first exposure area is in the exposure aperture. In a like manner, the trailer on the film strip must be wound off manually. A further disadvantage is that no provisions are made for automatically winding off a predetermined length of the film strip in the event that the supply chamber cover is opened before the last exposure has been made.

In the present invention the only functions required of the operator are the loading of the film into the supply chamber and placing the leading edge into the bite of the drive rolls, closing the supply chamber cover, actuating the operating button for making an exposure, and removing the magazine into which the exposed film is delivered. The operation of the camera is entirely automatic with the various functions of the camera being performed in proper sequence and timed relation by electrical means. By providing a plurality of interlocking electrical circuits, the film strip is fed past the exposure aperture for a predetermined number of exposures upon closing of the supply chamber cover without causing actuation of the illuminating means for the subject. After the completion of this multiple cycle, exposure and movement of single frames of film are made by the actuation of a single button. Upon the entry of the trailing edge of the film strip into the exposure aperture, the multiple-cycle circuit is again initiated to remove the last partial frame of film. If at any time while the supply chamber has film, the cover is opened and then closed, the multiple-cycle circuit will again be initiated before an exposure can be made. With these interlocking electrical circuits, errors by the operator are eliminated in making exposures, manual effort and control by the operator are reduced to a minimum, the threading and unloading of the film is very much simplified, and the camera assumes a form which is very compact and complete in its operation.

The primary object of the invention, therefore, is to provide a photographic camera which is entirely automatic and in which the sequence of performance of a plurality of interlocking electrical circuits are controlled by the closing of the film supply chamber cover.

Another object of the invention is to provide a fully automatic photographic camera in which the sequence of performance of a plurality of interlocking electrical circuits are controlled by the entry of the trailing edge of the film strip into the exposure aperture.

A still further object of the invention is to provide a fully automatic photographic camera having an electrical circuit initiated by the closing of the film supply chamber which will maintain a second electrical circuit energized for a predetermined length of time for winding off the fogged area of the film.

And still another object of the invention is to provide a fully automatic camera in which a severing means for the film strip is operative only when the cycling elements of the camera are inoperative.

And yet another object of the invention is to provide a fully automatic photographic camera having an electrical circuit which is initiated by the closing of a single switch to permit a plurality of cams to actuate a plurality of switches in properسequence to move an unexposed area of film into position, to actuate the shutter and illuminating means, and to release the severing means for the film strip.

A further object of the invention is to provide a fully automatic camera in which a single-cycle circuit is initiated by the closing of a switch to permit a plurality of cams to actuate a plurality of switches in proper sequence to move an unexposed area of film into position, and to actuate the shutter and illuminating means and which is provided with a severing means for the film strip adapted to be actuated only when the single-cycle circuit is inoperative.

And yet another object of the invention is to provide a fully automatic camera in which a single-cycle circuit is initiated by the closing of a switch to permit a plurality of cams to actuate a plurality of switches in proper sequence to move an unexposed area of film into position, to actuate the shutter and illuminating means, and to sever the film and which is maintained energized for a predetermined number of cycles by a multiple-cycle circuit initiated by the closing of the film supply chamber cover and the entry of the trailing edge of the film strip into the exposure aperture.

Other objects and advantages will be apparent to those skilled in the art from the description which follows.

The objects of the invention are embodied in a camera having a casing with a film supply chamber and a cover therefor, a lens, a shutter, an exposure aperture aligned with said lens and said shutter, an illuminating means outside of said casing, a film-advancing means for moving a film strip past said exposure aperture, means for actuating said shutter, a synchronizing means operatively connected to said actuating means for energizing said illuminating means in timed relation to the actuation of said shutter, a single-cycle circuit for initiating in proper sequence said film-advancing means, said shutter-actuating means and said synchronizing means, a single-cycle timing means, a multiple-cycle circuit in parallel circuit with said single-cycle circuit for maintaining said single-cycle circuit energized for a predetermined number of cycles upon closing of said cover and the entry of the trailing edge of the film strip into the exposure aperture, and a severing circuit for releasing the severing means for said film strip only when said single-cycle circuit and said multiple-cycle circuits are inoperative.

Reference is now made to the accompanying drawings wherein like reference numerals designate like parts and wherein:

Fig. 1 is a diagrammatic perspective view of the primary elements of the camera with certain elements shown out of normal position for clarity;

Fig. 2 is a side elevation of the end plates between which the various driven shafts are mounted;

Fig. 3 is a rear view of the film-retaining plate showing the arrangement for mounting the switches actuated by the trailing edge of the film;

Fig. 4 is a rear view of the exposure-aperture plate showing arrangement of the lower film-advancing rolls and the drive therefor;

Fig. 5 is a vertical section through the exposure station of the camera;

Fig. 6 is a vertical section through the timing shaft of the camera;

Fig. 7 is a vertical section through the knife shaft of the camera;

Fig. 8 is a section taken substantially on the line 8—8 of Fig. 7 showing the construction of the clutch on each of the operating shafts;

Fig. 9 is a vertical section through the cam shaft of the camera;

Figs. 10–14 show the relation of the various cams to the switches actuated thereby to obtain a given sequence of operation;

Fig. 15 is a wiring diagram of the interlocking circuits used in the camera; and Fig. 16 is a diagrammatic representation of a split contact-double throw switch.

Although the present disclosure of the invention is described as being embodied in a photographic camera, it shall be understood that this invention may also be applied to many and various other types of film-handling apparatus. In the illustrated embodiment of the invention, the camera is contained in a casing, not shown, having a film supply chamber 10 which is enclosed by the cover 11 pivoted at 12 on the casing. The casing also carries an objective lens 13 and a shutter 14 which are aligned with the exposure aperture 15 in the mounting plate 16, see Figs. 4 and 5.

The film-advancing means comprises roller 17 mounted on the cover 11, roller 18 mounted on the casing and a second set of rolls at the lower end of the exposure aperture including the film-measuring roller 19 mounted between the bearing portions 20 on the plate 16 and a spring biased roller 21 mounted between the arms 22 which are pivotally mounted on the extensions 23 of the plate 16, see Figs. 1 and 5. The roller 19 may be a rubber-covered roll extending the width of the film strip as shown in Fig. 1, or may be of the type shown in Fig. 4 in which individual rollers are mounted on the shaft 24 and have narrow rubber tires which engage only the edges of the film strip. The shaft 24 has a pulley 25 mounted thereon which is encircled by the crossed belt 26 to engage the pulley 27 on the shaft 28 of the roller 18. The film strip F is moved by the rolls 17, 18, 19, and 21 from the film supply chamber past the exposure aperture 15 and into the magazine 30. The magazine 30 may be of any light-tight construction, but is preferably of the type shown in the U. S. Patent 2,095,849, issued on October 12, 1937 to O. Wittel. This type of magazine is provided with a slide which is opened upon insertion into the camera for registering the aperture in the magazine with an aperture in the camera casing and upon removal from the camera is closed to make a light-tight container for the film therein.

The camera is provided with a motor 31 which drives a plurality of shafts for actuating the various elements of the camera in proper sequence. The driven shaft 32 is driven by the motor 31 through the worm 33 on the motor shaft and the worm wheel 34 on the shaft 32 which is rotated continuously as long as the motor is energized. The driven shaft 32 carries a pinion 35 on one end thereof which meshes with the gear 36 on the stub shaft 37. The stub shaft also carries a pinion 38 which meshes with a gear 39 on the timing shaft 40. The driven shaft 32 also carries a pinion 41 which meshes with the gear 42 on the cam shaft 43 and the gear 44 on the knife shaft 45 and at the extremity of the shaft carries a sprocket or pulley 46 which is encircled by a chain or belt 47 to drive the sprocket or pulley 48 on the shaft 24. The shafts 24, 40, 43, and 45 are provided with a clutch 49, as shown in Figs. 4, 6, 7, and 9. The clutch on each shaft is identical in construction so that only the one shown in Fig. 6 will be described. The clutch 49 comprises a driven member 50 of the shape best shown in Fig. 8 which is secured to the shaft 40 journaled in the end plates 51. The driving member 52 comprises a flanged sleeve 53 and a bearing portion 54 which is free to turn on the bushing 55 on the shaft 40, said bearing portion 54 also carrying the gear 39. A plate 56 carries a plurality of pins 57 which are adapted to enter the notched-out portions 58 of the driven member 50. The member 50 also carries a pin 59 which extends through an aperture in the plate 56 and is provided with a plurality of springs 60 for engaging the pins 57. As shown in Figs. 1 and 2, the plates 56 are held against rotation by the solenoids 61, 62, 63, and 64 with reference to the shafts 28, 40, 43, and 45, respectively. In Fig. 2, it will be noted that the solenoids are actually connected to the pivoted members 65 which engage the plates 56. With this construction, the gears 39, 42, and 44 and the sprocket 48 may be rotated but the shafts will not rotate until the plates 56 are released by the solenoids to permit the springs 60 to wedge the pins 57 between the sleeve 53 and the driven member 50. In other words, the entire driving mechanism is free to rotate, but the shafts 28, 40, 43, and 45 will not rotate until released by their respective holding solenoid.

The cam shaft 43 is journaled in the end plates 51, see Figs. 2 and 9, and has mounted thereon a film-advancing cam 68, a shutter-actuating cam 69, a knife-actuating cam 70, and a timing cam 71, which are adapted to actuate the switches 72, 73, 74, and 75, respectively. The shaft 40 is also provided with a timing cam 76 and a switch 77 adapted to be actuated thereby. The knife shaft 45 has mounted thereon a cam 78 which is adapted to engage and move the knife blade 79 forward against the film strip and against the action of the springs 80. The severed film then drops into the magazine 30, and the springs 80 return the knife blade to its normal rest position.

The shutter-actuating means comprises a cam 69 which is provided with a protuberance 81 and which is adapted to rock the arm 82 of the link 83 mounted in the block 84 to move the link 85 fixed to the arm 86 to the left, as shown in Fig. 1, to open the shutter blades 87. The blades 87 are returned to their closed position by the spring 88 secured to the arm 86.

The magazine 30 closes the normally-open switch 90 when it is properly positioned in the camera casing. The normally-open switch 91 is closed when the cover 11 is in its enclosing position and the switch 92 is closed and then opened as the cover is moved to its closed position. It will be noted from Fig. 15, that the switch 90 is placed in the line 105 in such a position that the magazine 30 must be in position before any potential enters any of the circuits. In a similar manner, the switch 91 must be closed by the movement of the cover to the closed position before any potential enters the circuits and as soon as the cover is opened, all of the circuits become dead. The switch 93 is actuated by the protuberance 94 on the bottom of the knife blade 79. The switch 95, see Figs. 1 and 3, is located on the rear of the film-retaining plate 96 and has the actuating roller 97 for the switch located adjacent one side of the top edge of the exposure aperture 15. A second switch 98 is also located on the plate 96 and has the actuating roller 99 adjacent the edge of the exposure aperture and at substantially the mid-line thereof. The various functions and sequence of operation of the cams, shafts, and switches just described can best be understood when described in conjunction with the operating cycle and electrical circuits of the camera.

The illuminating means comprises a vapor discharge lamp 101 which is discharged by the synchronizer 102. The synchronizer is of the type disclosed in the U. S. Patent 2,324,075 issued on July 13, 1943 to J. W. Gillon et al. and discharges the lamp 101 in timed relation to the actuation of the shutter 14.

It may be well to point out at this time that the switches 75, 77, 93, 95, and 98 are of the split contact-double throw type, as shown diagrammatically in Fig. 16, and are a well-known type of commercial switch. However, for the purpose of clarity and simplification of the wiring diagram, these switches have been split into individual switches, one being a normally-closed switch and the other a normally-open switch, with the understanding that when these switches are actuated both will change simultaneously. The timing switch 75, therefore, has been numbered 75' and 75'' on the wiring diagram, the timing switch 77 has been numbered 77' and 77'', the knife switch 93 has been numbered 93' and 93'', the film switch 95 has been numbered 95' and 95'', and the film switch 98 has been numbered 98' and 98''.

With no film in the camera, the cover 11 open, the magazine 30 removed from the casing, and the line switch 104 open, the various circuits are in the form shown in Fig. 15, with the normally-closed switches 72, 73, and 74 held in the open position by the cams 68, 69, and 70, respectively, which are in the position of rest, as shown in Figs. 10-12, and the solenoids 61, 62, 63, and 64 holding their respective shafts against rotation. The film roll is first placed in the chamber 10 and the leading edge of the film strip inserted into the bite of rollers 17 and 18. The magazine 30 may then be placed in position to close the switch 90, and the lines 105 and 106 connected to a source of power. The line switch 104 can then be closed, and the white lamp 107 connected across the lines 105 and 106 will then indicate the presence of a potential within the camera. The synchronizer 102 is connected into the camera by the lines 108 and 109 and obtains its potential from the lines 110 and 111. With a potential indicated by the lamp 107, the film in the camera, and the magazine in position, the cover 11 may be closed. As the cover is moved to its closed position, the switch 92 is closed and the relay Y is energized, the circuit being from line 105 to line 112, line 113, to line 114, through switch 92 to the line 115, and to the line 116 through the relay Y to the line 106. The switch 92 is held closed until the cover 11 reaches its closed position at which time the switch 91 will be closed and the switch 92 opened. The relay Y upon energization, closes its contacts $Y_1$ and $Y_2$ and opens $Y_3$. With the closing of $Y_1$, the line 117 is connected to the line 116 and the solenoid 62 is energized to release the shaft 40. The closing of $Y_2$ completes a circuit through the solenoid 63 to release the shaft 43 by the lines 118 and 119 through the relay contact $Y_2$ and the switch 75'' to the solenoid and the line 106. The closing of $Y_2$ also energizes the relay X by means of the lines 120 and 121 which results in the closing of its contacts $X_1$ and $X_2$ and opens $X_3$. With $Y_3$ in the open position, the circuit to the synchronizer 102 is broken. Closing of $X_1$ connects the line 120 with the line 122 to complete a circuit through the amber lamp 123 which indicates that the camera is functioning. The closing of $X_2$ connects line 119 with the line 124 to complete the circuit through the motor 31.

It is to be understood, of course, that the energization of the solenoids 62 and 63, of the relays X and Y, and of the motor 31 takes place instantaneously with closing of the cover 11. As a result, as soon as the motor 31 starts driving the shaft 32 and shaft 40 through the gears 35, 36, 38, and 39 and the clutch 49, the solenoid being contracted upon energization to withdraw the member 65 from engagement with the plate 56, the cam 76 is rotated counterclockwise to actuate the switch 77 by closing 77' and opening 77''. With the closing of 77' and the opening of switch 92 as the cover reaches its closed position, the relay Y is maintained energized through the line 112 to line 113, through 77' in line 117 to line 115, and through $Y_1$ to line 116 and the relay Y to the line 106. With the opening of 77'', the solenoid 62 is deenergized, and the member 65 is moved back into the path of the nose on plate 56 to limit the shaft 40 and the cam 76 to one complete revolution.

The energization of the solenoid 63 also permits the shaft 43 to be driven from the shaft 32 through the gears 41 and 42 and the clutch 49. As the shaft 43 rotates in a clockwise direction, the cams 68, 69, 70, and 71 rotate therewith. With reference to Figs. 10-13, it will be noted that the cam 71 immediately actuates the switch 75 to close 75' and open 75". The closing of 75' maintains the relay X energized by the circuit through the line 118 and 75' to line 125, through X' to line 121 and the relay X to line 106. The opening of 75" breaks the circuit through the solenoid 63 to deenergize it and permit the member 65 to return to its position for arresting the plate 56 upon one complete revolution of the shaft 43. The relation between shaft 40 and the shaft 43 through the gear trains connecting said shafts is such that shaft 43 makes 16 revolutions to one revolution of shaft 40. Since cam 76 on shaft 40 maintains the relay Y energized for one complete revolution thereof, the switch 75 will be actuated 16 times to energize the solenoid 63 and the relay X will be continuously energized either through $Y_2$ or 75' to maintain the motor 31 and the lamp 123 energized for sixteen cycles of shaft 43.

Upon rotation of the shaft 43, the cam 69 is rotated so that switch 73 is permitted to close when the contact member thereof enters the depression 69'. However, since relay Y is energized, $Y_3$ is held open and the synchronizer 102 does not function. At the same time, the switch 73 is actuated, the protuberance 81 strikes the arm 82 to move the link 85 to the left to actuate the shutter. The shutter-actuating means, therefore, includes the cam 69, the link 83 and the link 85, with the cam 69 also providing means for completing the circuit for actuating the synchronizer means. The cam 68 permits the switch 72 to close when the contact member enters the depression 68' which energizes the solenoid 61 through the line 105 to switch 72 and through the solenoid 61 to line 106. The solenoid 61 then releases the plate 56 and the shaft 32 through the sprocket 46, belt 47, sprocket 48 and clutch 49 drives the shaft 28 and the measuring roller 19. The roller 18 is driven from roller 19 by the belt 26, and the rollers 17 and 21 are driven through contact with the film strip. The film-advancing means, therefore, comprises the motor 31, the worm 33, the worm wheel 34, the shaft 32, the pulleys 46 and 48, the belt 47, the shaft 28, and the rollers 17, 18, 19, and 21 with the pulley 25 and 27 and the belt 26 connecting said rollers. After the advancing of the film, the cam 70 permits the switch 74 to close when the contact member enters the depression 70'. The closing of switch 74 completes a circuit to the solenoid 64 from line 119, through line 126 containing the switches 74 and 127 to the line 128, and through the solenoid 64 to the line 106. The solenoid 64, upon energization, releases the plate 56 and the shaft 32 which through the gears 41 and 44 and the clutch 49 rotates the shaft 45. The knife cam 78 is then rotated to move the blade 79 against the film strip to sever it so that it falls into the magazine 30. The springs 80 maintain the knife 79 in contact with the cam 78 and also serve to return the knife to its normal rest position. The severing means for the film strip, therefore, comprises the cam 78, the blade 79 and the springs 80.

From Figs. 10-14, it will be noted that the switches 73, 72, and 74 are actuated in timed relation to each other; in other words, the cams are mounted on the shaft 40 with their depressions arranged in a fixed relation to each other to obtain the proper sequence of operation. It will also be noted that switches 72, 73 and 74 are only closed momentarily to energize the solenoids 61, 63, and 64 to permit rotation of the shafts 28, 40, and 43 and to energize the synchronizer 102.

As the film is driven from the bite of the rolls 17 and 18 into the exposure station between the plates 16 and 96, the leading edge first strikes the actuating roller 97 to actuate switch 95 and close 95' and open 95". As the film is advanced into the exposure station, the leading edge, at substantially the mid-line of the aperture 15, strikes the actuating roller 99 to actuate switch 98 and close 98' and open 98" for a purpose to be described hereinafter.

When the cam 76 has made one revolution, the switch 77 will again be actuated to open 77' and close 77" which will deenergize the relay Y to open $Y_1$ and $Y_2$ and close $Y_3$. At the same time, the switch 75 will be actuated by cam 71 to open 75' and close 75" to deenergize the relay X to open $X_1$ and $X_2$ and close $X_3$. When the cams 71 and 76 reach this point, sixteen cycles of shaft 43 will have been made with 15 pieces of film severed from the roll to remove any fogged film. The reason for 15 pieces of film in 16 cycles is that the first cycle was completed before any film reached the rollers 19 and 21. At this point, the motor 31 will have stopped, the amber lamp 123 will be out, and the circuits will be as shown in Fig. 15 with the switches 90, 91, and 104 closed and 93' and 95' closed and 93" and 95" open. The camera is now ready for making single exposures.

The operator must only momentarily close the switch 130 by pushing a button on the outside of the camera casing to make an exposure, no other operations being necessary. Upon closure of switch 130, the relay X and solenoid 63 are energized through the line 118, line 119 to line 121, through switch 130 and relay X to line 106, through line 120 to line 119, and through 75" and solenoid 63 to line 106. Upon energization of relay X, motor 31 is energized to drive shaft 32 and solenoid 63 releases shaft 43 so that cam 71 first actuates switch 75 to close 75' to maintain the relay X energized and opens 75" to deenergize solenoid 63. Since relay Y is not energized, $Y_3$ remains closed and cam 69 closes switch 73 to energize the synchronizer 102 to permit energization of the lamp 101 in timed relation to the actuation of the shutter 14. The film is then advanced by the energization of solenoid 61 through the closure of switch 72 by the cam 68, and the severing means is actuated through the closing of switch 74 by the cam 70, as described above. The cam 71 is then arrested at the completion of one revolution by the member 65 engaging the plate 56, and switch 75 is actuated to open 75' to deenergize relay X. A pivoted link 131 is adapted to engage the pin 57 on each of the driven members 50 of the clutches 49 to prevent backward movement of the shaft upon engagement of the plate 56 with the members 65.

When only a partial frame of film remains above the rollers 17 and 18 and the operator actuates the switch 130 to make another exposure, the cycle is initiated as described above. However, when the trailing edge of the film strip reaches the top edge of the exposure aperture 15 during the pull-down of the partial frame, the roller 97 drops off the film strip to actuate the switch 95 to open 95' and close 95". Since the film is still under roller 99, 99' is still closed and a circuit is completed to energize relay Y through line 113 to line 116, through 99' and 95" to relay Y and line 106, and solenoid 62 is energized through line 115 and Y₁ to line 117, and through 77" and solenoid 62 to line 106. The shaft 43 will, therefore, make 16 complete cycles as when the cover 11 is moved to the closed position. As the trailing edge of the film strip passes the roller 99, the switch 98 is actuated to open 98' and close 98", a circuit is then completed through line 113 and 98" to the red lamp 132 to indicate that the last exposure was made. The amber lamp 123 at the same time will indicate that the camera is still in operation and the cover should not be opened.

From the foregoing description, it will be noted that the solenoid 63 and the relay X comprise the single-cycle circuit, the solenoid 63 releasing the cam shaft 43 to cause the functions of the camera to be performed in proper sequence, and the relay X maintaining the motor 31 energized for the period of the single cycle. The single-cycle timing means comprises the cam 71 and the switch 75 which maintains the relay X energized and deenergizes the solenoid 63 and causes the circuit to assume the proper relation for the next exposure. The multiple-cycle circuit includes the relay Y and the solenoid 62, the solenoid releasing the multiple-cycle timing means and the relay Y maintaining the relay X energized for a predetermined number of cycles and reenergizing solenoid 62 at the end of each cycle. The multiple-cycle timing means includes the cam 76 and the switch 77 which maintains the relay Y energized for a predetermined period.

If, for reasons of processing or any other reason, it is desired to eliminate automatic severing of the film strip and leave the exposures in strip or rolled form, the switch 127 in the line 126 need merely be opened. The switch 133, however, is provided to permit severing of the film at any time. With film in the exposure aperture 15, 95' and 98' are closed, and the switch 93 is held by the protuberance 94 on knife 79 when in the normal position so that 93' is closed and 93" is opened. Upon closing of switch 133, the solenoid 64 is energized by the circuit comprising the line 113 to line 116, line 134 through switch 133 to line 128 and to both the motor 31 and the solenoid 64 to the line 106. With this arrangement, the solenoid 64 may be energized manually after each exposure or any number of exposures. The contact X₃, however, is placed in the line 128 so that the solenoid 64 may be energized only when the single-cycle circuit and the multiple-cycle circuits are inoperative which is indicated by the lamp 123 being deenergized. It will be noted that film must also be in the exposure aperture 15 with 95' and 98' closed in order to actuate the knife manually. This arrangement provides a proper sequence of operation and eliminates any error on the part of the operator.

Since other modifications of the invention are possible, the scope of the invention is not to be limited to the illustrated embodiments but is defined by the appended claims.

We claim:

1. In a photographic camera of the type described, the combination comprising a casing having a film supply chamber and a cover therefor, an exposure aperture, a film-advancing means for intermittently moving a film strip from said supply chamber past said exposure aperture, a single-cycle circuit for initiating said film-advancing means, and a multiple-cycle circuit in parallel circuit with said single-cycle circuit and including a solenoid and a relay, said solenoid and relay being energized upon closing of said cover to initiate said single-cycle circuit for a predetermined number of cycles.

2. In a photographic camera of the type described, the combination comprising a casing having a film supply chamber and a cover therefor, an exposure aperture, a film-advancing means for intermittently moving a film strip from said supply chamber past said exposure aperture, a single-cycle circuit for initiating said film-advancing means, and a multiple-cycle circuit in parallel circuit with said single-cycle circuit and including a solenoid and a relay, said solenoid and relay being energized upon entry of the trailing edge of said film strip into said exposure aperture to initiate said single-cycle circuit for a predetermined number of cycles.

3. In a photographic camera of the type described, the combination comprising a casing having a film supply chamber and a cover therefor, an exposure aperture, a film-advancing means for intermittently moving a film strip from said supply chamber past said exposure aperture, a single-cycle circuit for initiating said film-advancing means, and a multiple-cycle circuit in parallel circuit with said single-cycle circuit and including a solenoid and a relay, said solenoid and relay being energized upon the closing of said cover and the entry of the trailing edge of said film strip into said exposure aperture to initiate said single-cycle circuit for a predetermined number of cycles.

4. In a photographic camera of the type described, the combination comprising a casing having a film supply chamber and a cover therefor, an exposure aperture, a film-advancing means for intermittently moving a film strip from said supply chamber past said exposure aperture, a single-cycle circuit for initiating said film-advancing means, a multiple-cycle circuit in parallel circuit with said single-cycle circuit and including a solenoid and a relay in parallel circuit, said solenoid and said relay being energized by the closing of said cover to initiate said single-cycle circuit, and a multiple-cycle timing means adapted to be released upon energization of said solenoid for maintaining said single-cycle circuit operative for a predetermined number of cycles.

5. In a photographic camera of the type described, the combination comprising a casing having a film supply chamber and a cover therefor, an exposure aperture, a film-advancing means for intermittently moving a film strip from said supply chamber past said exposure aperture, a single-cycle circuit for initiating said film-advancing means, a multiple-cycle circuit in parallel circuit with said single-cycle circuit and including a solenoid and a relay in parallel circuit, said relay being momentarily energized by the closing of said cover to initiate said single-cycle circuit, and a multiple-cycle timing means including a cam-operated switch adapted to be released upon energization of said solenoid by the closing of said cover to de-energize said solenoid and to maintain said relay energized for maintaining said single-cycle circuit operative for a predetermined number of cycles.

6. In a photographic camera of the type described, the combination comprising a casing having a film supply chamber and a cover therefor, an exposure aperture, a film-advancing means for intermittently moving a film strip from said supply chamber past said exposure aperture, a single-cycle circuit for initiating said film-advancing means, a multiple-cycle circuit in parallel circuit with said single-cycle circuit for initiating said single-cycle circuit for a predetermined number of cycles, a normally-open switch in series with said multiple-cycle circuit and adapted to be momentarily closed by movement of said cover to the closed position for energizing said multiple-cycle circuit to initiate said single-cycle circuit, and a second normally-open switch in series with said single-cycle circuit and adapted to be closed when said cover is in the closed position and before said first-mentioned switch is re-opened to energize said single-cycle circuit.

7. In a photographic camera of the type described, the combination comprising a casing having a film supply chamber and a cover therefor, an exposure aperture, a film-advancing means for intermittently moving a film strip from said supply chamber past said exposure aperture, a single-cycle circuit for initiating said film-advancing means, a multiple-cycle circuit in parallel circuit with said single-cycle circuit for initiating said single-cycle circuit for a predetermined number of cycles, a normally-closed switch in series with said multiple-cycle circuit adjacent the upper edge of said exposure aperture and adapted to be held open by said film strip, and a normally-open switch in series with said first-mentioned switch located midway along said exposure aperture and adapted to be held closed by said film strip, said normally-closed switch being allowed to close as the trailing edge of the film strip enters said exposure aperture to energize said multiple-cycle circuit to initiate said single-cycle circuit and said normally-open switch being allowed to open as the trailing edge of said film strip passes the midpoint of said exposure aperture to break the circuit through said switches to said multiple-cycle circuit.

8. In a photographic camera of the type described, the combination comprising a casing having a film supply chamber and a cover therefor, an exposure aperture, a film-advancing means for intermittently moving a film strip from said supply chamber past said exposure aperture, a single-cycle circuit for initiating said film-advancing means, a multiple-cycle circuit in parallel circuit with said single-cycle circuit for initiating said single-cycle circuit for predetermined number of cycles, a normally-closed switch in series with said multiple-cycle circuit adjacent the upper edge of said exposure aperture and adapted to be held open by said film strip, and a normally-open switch in series with said first-mentioned switch located midway along said exposure aperture and adapted to be held closed by said film strip, said normally-closed switch being allowed to close as the trailing edge of the film strip enters said exposure aperture to energize said multiple-cycle circuit to initiate said single-cycle circuit and said normally-open switch being allowed to open as the trailing edge of said film strip passes the midpoint of said exposure aperture to break the circuit through said switches to said multiple-cycle circuit, and an indicating means for the last exposure frame of said film strip responsive only when said normally-open switch is in the open position.

9. In a photographic camera of the type described, the combination comprising a casing having a film supply chamber and a cover therefor, an exposure aperture, a film-advancing means for intermittently moving a film strip from said supply chamber past said exposure aperture, a single-cycle circuit for initiating said film-advancing means, a multiple-cycle circuit in parallel circuit with said single-cycle circuit for initiating said single-cycle circuit for a predetermined number of cycles, a normally-closed switch in series with said multiple-cycle circuit adjacent the upper edge of said exposure aperture and adapted to be held open by said film strip, and a normally-open switch in series with said first-mentioned switch located midway along said exposure aperture and adapted to be held closed by said film strip, said switches being successively actuated by the trailing edge of said film strip to energize said multiple-cycle circuit for initiating said single-cycle circuit for a predetermined number of cycles.

10. In a photographic camera of the type described, the combination comprising a casing having a film supply chamber and a cover therefor, an exposure aperture, a film-advancing means for intermittently moving a film strip from said supply chamber past said exposure aperture, a single-cycle circuit for initiating said film-advancing means and including a solenoid and a relay in parallel circuit, electrical means actuated by said cover when in the closed position for permitting said single-cycle circuit to be energized, an operating switch in series circuit with said relay and said solenoid for initiating said single-cycle circuit, and a cycle-timing means including a cam-operated switch adapted to be actuated upon energization of said solenoid for de-energizing said solenoid and for maintaining said relay energized for one complete cycle to move a predetermined length of said film strip past said exposure aperture.

11. In a photographic camera of the type described, the combination comprising a casing having a film supply chamber and a cover therefor, an exposure aperture, a film-advancing means for intermittently moving a film strip from said supply chamber past said exposure aperture, a single-cycle circuit for initiating said film-advancing means and including a solenoid and a relay in parallel circuit, electrical means actuated by said cover when in the closed position for permitting said single-cycle circuit to be energized, an operating switch in series circuit with said relay and said solenoid for initiating said single-cycle circuit, and a cycle-timing means including a cam and a switch operated thereby, said cam being released upon energization of said solenoid to actuate said switch for de-energizing said solenoid and for maintaining said relay energized for one complete revolution of said cam for moving a predetermined length of said film strip past said exposure aperture.

12. In a photographic camera of the type described, the combination comprising a casing having a film supply chamber and a cover therefor, an exposure aperture, a film-advancing means for intermittently moving a film strip from said supply chamber past said exposure aperture, a single-cycle circuit for initiating said film-advancing means and including a solenoid and a relay in parallel circuit and an operating switch in series circuit therewith for initiating said single-cycle circuit, a single-cycle timing means including a cam-operated switch adapted to be actuated upon energization of said solenoid for de-energizing said solenoid and for maintaining said relay energized for one complete cycle to move a predetermined length of said film strip past said exposure aperture, a multiple-cycle circuit in parallel circuit with said single-cycle circuit and including a second relay and a second solenoid in parallel circuit, said second solenoid and said second relay being energized upon closing of said cover to initiate said single-cycle circuit, a multiple-cycle timing means including a cam-operated switch adapted to be released upon energization of said second solenoid for de-energizing said second solenoid and maintaining said second relay energized to maintain said first-mentioned relay energized for a predetermined number of cycles of said single-cycle timing means.

13. In a photographic camera of the type described, the combination comprising a casing having a film supply chamber and a cover therefor, an exposure aperture, a film-advancing means for intermittently moving a film strip from said supply chamber past said exposure aperture, a single-cycle circuit for initiating said film-advancing means and including a solenoid and a relay in parallel circuit and an operating switch in series circuit therewith for manually initiating said single-cycle circuit, a single-cycle timing means including a cam and a switch operated thereby, said cam being released upon energization of said solenoid for de-energizing said solenoid and for maintaining said relay energized for one complete revolution of said cam for moving a predetermined length of said film strip past said exposure aperture, a multiple-cycle circuit in parallel circuit with said single-cycle circuit and including a second relay and a second solenoid in parallel circuit, said second solenoid and said second relay being energized by the closing of said cover and the entry of the trailing edge of said film strip into said exposure aperture to initiate said single-cycle circuit, and a multiple-cycle timing means including a cam-operated switch adapted to be released upon energization of said second solenoid for de-energizing said second solenoid and maintaining said second relay energized to maintain said first-mentioned relay energized for a predetermined number of cycles of said single-cycle timing means.

14. In a photographic camera of the type described, the combination comprising a casing having a film supply chamber and a cover therefor, an exposure aperture, a film-advancing means for intermittently moving a film strip from said supply chamber past said exposure aperture, a severing means for said film strip adjacent the lower edge of said exposure aperture, a single-cycle circuit for initiating said film-advancing means, a multiple-cycle circuit in parallel with said single-cycle circuit and adapted upon the closing of said cover and the entry of the trailing edge of said film strip into said exposure aperture to be energized for initiating said single-cycle circuit for a predetermined number of cycles, a cycle-timing means for controlling said single-cycle and multiple-cycle circuits, and an electrical circuit in parallel circuit with said single- and multiple-cycle circuits and including a solenoid and a switch means, said switch means being actuated by said cycle-timing means to energize said solenoid for releasing said severing means only when said single-cycle and multiple-cycle circuits are inoperative.

15. In a photographic camera of the type described, the combination comprising a casing having a film supply chamber and a cover therefor, an exposure aperture, a film-advancing means for intermittently moving a film strip from said supply chamber past said exposure aperture, a severing means for said film strip adjacent the lower edge of said exposure aperture, a single-cycle circuit for initiating said film-advancing means and including a solenoid and a relay in parallel circuit, electrical means actuated by said cover when in the closed position for permitting said single-cycle circuit to be energized, an operating switch in series circuit with said relay and said solenoid for initiating said single-cycle circuit, and a cycle-timing means including a cam and a switch operated thereby, said cam being released upon energization of said solenoid to actuate said switch for de-energizing said solenoid and for maintaining said relay energized for one complete revolution of said cam for moving a predetermined length of said film strip past said exposure aperture, and an electrical circuit in parallel circuit with said single-cycle circuit and including a solenoid, a switch means and a second switch means adjacent said exposure aperture and adapted to be maintained in an operative circuit position by said film strip, said switch means being actuated by said cycle-timing means to energize said solenoid for releasing said severing means only when said film strip is in position over said exposure aperture.

16. In a photographic camera of the type described, the combination comprising a casing having a film supply chamber and a cover therefor, an exposure aperture, a film-advancing means for intermittently moving a film strip from said supply chamber past said exposure aperture, a severing means for said film strip adjacent the lower edge of said exposure aperture, a single-cycle circuit for initiating said film-advancing means and including a solenoid and a relay in parallel circuit, electrical means actuated by said cover when in the closed position for permitting said single-cycle circuit to be energized, an operating switch in series circuit with said relay and said solenoid for initiating said single-cycle circuit, and a cycle-timing means including a cam and a switch operated thereby, said cam being released upon energization of said solenoid to actuate said switch for de-energizing said solenoid and for maintaining said relay energized for one complete revolution of said cam for moving a predetermined length of said film strip past said exposure aperture, a multiple-cycle circuit in parallel circuit with said single-cycle circuit for initiating said single-cycle circuit for a predetermined number of cycles, and an electrical circuit in parallel circuit with said single- and multiple-cycle circuits and including a solenoid, a switch means and a second switch means adjacent said exposure aperture and adapted to be maintained in an operative circuit position by said film strip, said switch means being actuated by said cycle-timing means to energize said solenoid for releasing said severing means only when said film strip is in position over said exposure aperture and said single-cycle and multiple-cycle circuits are inoperative.

17. In a photographic camera of the type described, the combination comprising a casing having a film supply chamber and a cover therefor, a lens, a shutter, an exposure aperture aligned with said lens and said shutter, illuminating means outside of said casing, a film-advancing means for intermittently moving a film strip from said supply chamber past said exposure aperture, an actuating means for said shutter, a synchronizing means operatively connected to said actuating means for energizing said illuminating means in timed relation to the actuation of said shutter, a single-cycle circuit for initiating said actuating means and said film-advancing means in proper sequence, and a multiple-cycle circuit in parallel circuit with said single-cycle circuit and including a solenoid and a relay in parallel circuit, said relay being momentarily energized by the closing of said cover to energize said solenoid, to render said synchronizing means inoperative and to initiate said single-cycle circuit, and a multiple-cycle timing means including a cam-operated switch adapted to be released by said solenoid to maintain said relay energized and to de-energize said solenoid for maintaining said single-cycle circuit operative for a predetermined number of cycles.

18. In a photographic camera of the type described, the combination comprising a casing having a film supply chamber and a cover therefor, a lens, a shutter, an exposure aperture aligned with said lens and said shutter, illuminating means outside of said casing, a film-advancing means for intermittently moving a film strip from said supply chamber past said exposure aperture, a severing means adjacent said exposure aperture for said film strip, an actuating means for said shutter, a synchronizing means operatively connected to said actuating means for energizing said illuminating means in timed relation to the actuation of said shutter, a single-cycle circuit including a relay and a solenoid for holding a plurality of cams against rotation, said cams being adapted upon rotation to actuate said shutter actuating means and a plurality of switches in sequence for initiating in proper sequence said actuating means, said film-advancing means, and said severing means, a manually-operated switch in series circuit with said relay and said solenoid for energizing said single-cycle circuit, and a cycle-timing means including a cam and a switch adapted to be actuated thereby, said cam upon being released actuating said switch to de-energize said solenoid and to maintain said relay energized for one complete revolution of said cam.

19. In a photographic camera of the type described, the combination comprising a casing having a film supply chamber and a cover therefor, a lens, a shutter, an exposure aperture aligned with said lens and said shutter, illuminating means outside of said casing, a film-advancing means for intermittently moving a film strip from said supply chamber past said exposure aperture, an actuating means for said shutter, a synchronizing means operatively connected to said actuating means for energizing said illuminating means in timed relation to the actuation of said shutter, a single-cycle circuit for initiating in proper sequence said film-advancing means, said actuating means, and said synchronizing means and including a solenoid and a relay in parallel circuit and an operating switch in series circuit therewith for initiating said single-cycle circuit, a single-cycle timing means including a cam-operated switch adapted to be actuated upon energization of said solenoid for de-energizing said solenoid and for maintaining said relay energized for one complete cycle of said single-cycle circuit, a multiple-cycle circuit in parallel circuit with said single-cycle circuit and including a second relay and a second solenoid in parallel circuit, said second solenoid and said second relay being energized upon closing of said cover to initiate said single-cycle circuit, and a multiple-cycle timing means including a cam-operated switch adapted to be released upon energization of said second solenoid for de-energizing said second solenoid and maintaining said second relay energized to maintain said first-mentioned relay energized for a predetermined number of cycles of said single-cycle timing means.

20. In a photographic camera of the type described, the combination comprising a casing having a film supply chamber and a cover therefor, a lens, a shutter, an exposure aperture aligned with said lens and said shutter, illuminating means outside of said casing, a film-advancing means for intermittently moving a film strip from said supply chamber past said exposure aperture, a severing means for said film strip adjacent said exposure aperture, an actuating means for said shutter, a synchronizing means operatively connected to said actuating means for energizing said illuminating means in timed relation to the actuation of said shutter, a single-cycle circuit including a relay and a solenoid in parallel circuit, said solenoid being adapted to normally hold a plurality of cams against rotation, an operating switch in series circuit with said relay and said solenoid for energizing said relay and said solenoid, said solenoid upon energization releasing said cams to permit actuation in proper sequence of said actuating means, said film-advancing means, and said severing means, a single-cycle timing means including a cam and a switch adapted to be actuated thereby, said cam being held against rotation by said solenoid and upon release actuating said switch to de-energize said solenoid and to maintain said relay energized for one complete revolution of said cam, a multiple-cycle circuit in parallel circuit with said single-cycle circuit and including a second relay and a second solenoid in parallel circuit, said second solenoid and said second relay being energized upon the closing of said cover and the entry of the trailing edge of said film strip into said exposure aperture to initiate said single-cycle circuit, and a multiple-cycle timing means including a cam and a switch, said cam being adapted to be released upon energization of said second solenoid to de-energize said solenoid and to maintain said second relay energized for maintaining said first-mentioned relay energized for a predetermined number of cycles of said single-cycle timing means.

21. In a photographic camera of the type described, the combination comprising a casing having a film-supply chamber and a cover therefor, a lens, a shutter, an exposure aperture aligned with said lens and said shutter, illuminating means outside of said casing, a film-advancing means for intermittently moving a film strip from said supply chamber past said exposure aperture, a severing means adjacent said exposure aperture for said film strip, an actuating means for said shutter, a synchronizing means operatively connected to said actuating means for energizing said illuminating means in timed relation to the actuation of said shutter, a single-cycle circuit including a relay and a solenoid for holding a plurality of cams against rotation, said cams being adapted upon rotation to actuate said shutter actuating means and a plurality of switches in sequence for initiating said actuating means and said film-advancing means, a manually-operated switch in series circuit with said relay and said solenoid for energizing said single-cycle circuit, a cycle-timing means including a cam and a switch adapted to be actuated thereby, said cam upon being released actuating said switch to deenergize said solenoid and to maintain said relay energized for one complete revolution of said cam, and an electrical circuit in parallel circuit with said single-cycle circuit and including a solenoid and a switch means, said switch means being actuated by said cycle-timing means to energize said solenoid for releasing said severing means only when said single-cycle circuit is inoperative.

22. In a photographic camera of the type described, the combination comprising a casing having a film-supply chamber and a cover therefor, a lens, a shutter, an exposure aperture aligned with said lens and said shutter, illuminating means outside of said casing, a film-advancing means for intermittently moving a film strip from said supply chamber past said exposure aperture, a severing means adjacent said exposure aperture for said film strip, an actuating means for said shutter, a synchronizing means operatively connected to said actuating means for energizing said illuminating means in timed relation to the actuation of said shutter, a single-cycle circuit including a relay and a solenoid for holding a plurality of cams against rotation, said cams being adapted upon rotation to actuate said shutter actuating means and a plurality of switches in sequence for initiating said actuating means and said film-advancing means, a manually-operated switch in series circuit with said relay and said solenoid for energizing said single-cycle circuit, a cycle-timing means including a cam and a switch adapted to be actuated thereby, said cam upon being released actuating said switch to deenergize said solenoid and to maintain said relay energized for one complete revolution of said cam, and an electrical circuit in parallel circuit with said single-cycle circuit and including a solenoid, a switch means and a second switch means adjacent said exposure aperture and adapted to be maintained in an operative circuit position by said film strip, said switch means being actuated by said cycle-timing means to energize said solenoid for releasing said severing means only when said film strip is in position over said exposure aperture and said single-cycle circuit is inoperative.

23. In a photographic camera of the type described, the combination comprising a casing having a film-supply chamber and a cover therefor, a lens, a shutter, an exposure aperture aligned with said lens and said shutter, a driven shaft, means including a motor for driving said driven shaft, a cam shaft operatively connected to said driven shaft, a film-advancing means for intermittently moving a film strip from said supply chamber past said exposure aperture and operatively connected to said driven shaft, means including a plurality of solenoids for holding said cam shaft and said film-advancing means against rotation, a single-cycle circuit including said cam shaft solenoid and a relay in parallel circuit and an operating switch in series circuit therewith and adapted upon being closed to energize said cam-shaft solenoid to permit rotation of said cam shaft and to energize said relay for maintaining said motor energized, and means on said cam shaft including a plurality of cams for actuating a plurality of switches in proper sequence to release said film-advancing means and to deenergize said single-cycle circuit upon one complete revolution of said cam shaft.

24. In a photographic camera of the type described, the combination comprising a casing having a film-supply chamber and a cover therefor, a lens, a shutter, an exposure aperture aligned with said lens and said shutter, a shutter actuating means, a driven shaft, means including a motor for driving said driven shaft, a cam shaft operatively connected to said driven shaft, a severing means for said film strip operatively connected to said driven shaft, a film-advancing means for intermittently moving a film strip from said supply chamber past said exposure aperture and operatively connected to said driven shaft, means including a plurality of solenoids for holding said cam shaft, said severing means, and said film-advancing means against rotation, a single-cycle circuit including said cam-shaft solenoid and a relay in parallel circuit and an operating switch in series circuit therewith and adapted upon being closed to energize said cam-shaft solenoid to permit rotation of said cam shaft and to energize said relay for maintaining said motor energized, and means on said cam shaft including a plurality of cams for actuating said shutter actuating means and a plurality of switches in proper sequence to actuate said shutter, to release said film-advancing means, to release said severing means, and to deenergize said single-cycle circuit upon one complete revolution of said cam shaft.

25. In a photographic camera of the type described, the combination comprising a casing having a film-supply chamber and a cover therefor, a lens, a shutter, an exposure aperture aligned with said lens and said shutter, a shutter actuating means, illuminating means outside of said casing, a synchronizing means operatively connected to said shutter actuating means for energizing said illuminating means in timed relation to the actuation of said shutter, a driven shaft, means including a motor for driving said driven shaft, a cam shaft operatively connected to said driven shaft, a severing means for said film strip operatively connected to said driven shaft, a film-advancing means for intermittently moving a film strip from said supply chamber past said exposure aperture and operatively connected to said driven shaft, means including a plurality of solenoids for holding said cam shaft, said severing means, and said film-advancing means against rotation, a single-cycle circuit including said cam-shaft solenoid and a relay in parallel circuit and an operating switch in series circuit therewith and adapted upon being closed to energize said cam-shaft solenoid to permit rotation of said cam shaft and to energize said relay for maintaining said motor energized, and means on said cam shaft including a plurality of cams for actuating said shutter actuating means and a plurality of switches in proper sequence to actuate said shutter, to release said film-advancing means, and said synchronizing means, to release said severing means, and to deenergize said single-cycle circuit upon one complete revolution of said cam shaft.

26. In a photographic camera of the type described, the combination comprising a casing having a film-supply chamber and a cover therefor, a lens, a shutter, an exposure aperture aligned with said lens and said shutter, a driven shaft, means including a motor for driving said driven shaft, a cam shaft operatively connected to said driven shaft, a multiple-cycle timing shaft operatively connected to said cam shaft, a film-advancing means for intermittently moving a film strip from said supply chamber past said exposure aperture and operatively connected to said driven shaft, means including a plurality of solenoids for holding said cam shaft, said timing shaft, and said film-advancing means against rotation, a single-cycle circuit including said cam-shaft solenoid and a relay in parallel circuit said relay being adapted upon energization to energize said motor, means on said cam shaft including a plurality of cams for actuating a plurality of switches in proper sequence to release said film-advancing means and to deenergize said single-cycle circuit upon one complete revolution of said cam shaft, a multiple-cycle circuit in parallel circuit with said single-cycle circuit and including said timing-shaft solenoid and a second relay in parallel circuit, said timing-shaft solenoid and said second relay being energized upon closing of said cover to release said timing shaft and to initiate said single-cycle circuit respectively, means on said timing shaft including a cam adapted to be limited to one revolution for actuating a switch to deenergize said timing-shaft solenoid and to maintain said second relay and said single-cycle circuit energized for a predetermined number of revolutions of said cam shaft.

27. In a photographic camera of the type described, the combination comprising a casing having a film-supply chamber and a cover therefor, a lens, a shutter, an exposure aperture aligned with said lens and said shutter, a driven shaft, means including a motor for driving said driven shaft, a cam shaft operatively connected to said driven shaft, a multiple-cycle timing shaft operatively connected to said cam shaft, a film-advancing means for intermittently moving a film strip from said supply chamber past said exposure aperture and operatively connected to said driven shaft, a severing means for said film strip including a shaft operatively connected to said driven shaft and held against rotation by a solenoid, means including a plurality of solenoids for holding said cam shaft, said timing shaft, and said film-advancing means against rotation, a single-cycle circuit including said cam-shaft solenoid and a relay in parallel circuit, said relay being adapted upon energization to energize said motor, means on said cam shaft including a plurality of cams for actuating a plurality of switches in proper sequence to release said film-advancing means and to deenergize said single-cycle circuit upon one complete revolution of said cam shaft, a multiple-cycle circuit in parallel circuit with said single-cycle circuit and including said timing-shaft solenoid and a second relay in parallel circuit, said timing-shaft solenoid and said second relay being energized upon closing of said cover to release said timing shaft and to initiate said single-cycle circuit, respectively, means on said timing shaft including a cam adapted to be limited to one revolution for actuating a switch to deenergize said timing-shaft solenoid and to maintain said second relay and said single-cycle circuit energized for a predetermined number of revolutions of said cam shaft, and a severing means circuit in parallel circuit with said single-cycle circuit and including a switch means in parallel circuit with the holding solenoid of said severing means and actuated by a cam on said cam shaft to energize said holding solenoid for releasing said severing means only when said single-cycle circuit and said multiple-cycle circuit are inoperative.

28. In a photographic camera of the type described, the combination comprising a casing having a film-supply chamber and a cover therefor, a lens, a shutter, an exposure aperture aligned with said lens and said shutter, a driven shaft, means including a motor for driving said driven shaft, a cam shaft operatively connected to said driven shaft, a film-advancing means for intermittently moving a film strip from said supply chamber past said exposure aperture and operatively connected to said driven shaft, means including a plurality of solenoids for holding said cam shaft and said film-advancing means against rotation, a severing means for said film strip including a shaft operatively connected to said driven shaft and held against rotation by a solenoid, a single-cycle circuit including said cam-shaft solenoid and a relay in parallel circuit and an operating switch in series circuit therewith and adapted upon being closed to energize said cam-shaft solenoid to permit rotation of said cam shaft and to energize said relay for maintaining said motor energized, and means on said cam shaft including a plurality of cams for actuating a plurality of switches in proper sequence to release said film-advancing means and to deenergize said single-cycle circuit upon one complete revolution of said cam shaft, and a severing-means circuit in parallel circuit with said single-cycle circuit and including a switch means in parallel circuit with the holding solenoid of said severing means and actuated by a cam on said cam shaft to energize said holding solenoid for releasing said severing-means only when said single-cycle circuit is inoperative.

29. In a photographic camera of the type described, the combination comprising a casing having a film-supply chamber and a cover therefor, a lens, a shutter, an exposure aperture aligned with said lens and said shutter, a driven shaft, means including a motor for driving said driven shaft, a cam shaft operatively connected to said driven shaft, a multiple-cycle timing shaft operatively connected to said cam shaft, a film-advancing means for intermittently moving a film strip from said supply chamber past said exposure aperture and operatively connected to said driven shaft, means including a plurality of solenoids for holding said cam shaft, said timing shaft, and said film-advancing means against rotation, a single-cycle circuit including said cam-shaft solenoid and a relay in parallel circuit, said relay being adapted upon energization to energize said motor, means on said cam shaft including a plurality of cams for actuating a plurality of switches in proper sequence to release said film-advancing means and to deenergize said single-cycle circuit upon one complete revolution of said cam shaft, a multiple-cycle circuit in parallel circuit with said single-cycle circuit and including said timing-shaft solenoid and a second relay in parallel circuit, said timing-shaft solenoid and said second relay being energized upon closing of said cover and entry of the trailing edge of said film strip into said exposure aperture to release said timing shaft and to initiate said single-cycle circuit respectively, and means on said timing shaft including a cam adapted to be limited to one revolution for actuating a switch to deenergize said timing-shaft solenoid and to maintain said second relay and said single-cycle circuit energized for a predetermined number of revolutions of said cam shaft.

30. In a photographic camera of the type described, the combination comprising a casing having a film-supply chamber and a cover therefor, a lens, a shutter, an exposure aperture aligned with said lens and said shutter, a shutter-actuating means, illuminating means outside of said casing, a synchronizing means operatively connected to said shutter-actuating means for energizing said illuminating means in timed relation to the actuation of said shutter, a driven shaft, means including a motor for driving said driven shaft, a cam shaft operatively connected to said driven shaft, a severing means for said film strip operatively connected to said driven shaft, a multiple-cycle timing shaft operatively connected to said cam shaft, a film-advancing means for intermittently moving a film strip from said supply chamber past said exposure aperture and operatively connected to said driven shaft, means including a plurality of solenoids for holding said cam shaft, said severing means, said timing shaft, and said film-advancing means against rotation, a single-cycle circuit including said cam-shaft solenoid and a relay in parallel circuit and an operating switch in series circuit therewith and adapted upon being closed to energize said relay for maintaining said motor energized, means on said cam shaft including a plurality of cams for actuating said shutter actuating means and a plurality of switches in proper sequence to actuate said shutter and synchronizing means, to release said film-advancing means, to release said severing means, and to deenergize said single-cycle circuit upon one complete revolution of said cam shaft, a multiple-cycle circuit in parallel circuit with said single-cycle circuit and including said timing-shaft solenoid and a second relay in parallel circuit, said timing-shaft solenoid and said second relay being energized upon closing of said cover and the entry of the trailing edge of said film strip into said exposure aperture to release said timing shaft and to initiate said single-cycle circuit respectively, and means on said timing shaft including a cam adapted to be limited to one revolution for actuating a switch to deenergize said timing-shaft solenoid and to maintain said second relay and said single-cycle circuit energized for a predetermined number of revolutions of said cam shaft.

WILLIAM BORNEMANN.
NORMAN R. NEWMAN.

REFERENCES CITED

The following references are of record in the file of this patent:

UNITED STATES PATENTS

| Number | Name | Date |
|---|---|---|
| 1,963,095 | Petit et al. | June 19, 1934 |
| 2,161,391 | Schubert | June 6, 1939 |
| 2,166,419 | O'Neill | July 18, 1939 |
| 2,351,399 | Coracciolo et al. | June 13, 1944 |
| 2,371,592 | Gorey | Mar. 13, 1945 |
| 2,446,668 | Tuttle et al. | Aug. 10, 1948 |

FOREIGN PATENTS

| Number | Country | Date |
|---|---|---|
| 557,050 | Great Britain | Nov. 2, 1943 |